United States Patent
Schmiade

[11] Patent Number: 6,010,650
[45] Date of Patent: Jan. 4, 2000

[54] PRODUCTION OF PIPES INSULATED WITH FOAMS

[75] Inventor: Werner Schmiade, Lembruch, Germany

[73] Assignee: BASF Aktiengesellschaft, Ludwigshafen, Germany

[21] Appl. No.: 09/042,745

[22] Filed: Mar. 17, 1998

[51] Int. Cl.$^7$ .............................. B29C 44/06; B29C 44/12

[52] U.S. Cl. ...................... 264/45.7; 264/46.6; 264/46.9; 264/268

[58] Field of Search ................... 264/46.9, 45.7, 264/46.6, 268

[56] References Cited

U.S. PATENT DOCUMENTS

| | | | |
|---|---|---|---|
| 3,444,279 | 5/1969 | Dost | 264/46.9 |
| 3,492,029 | 1/1970 | French et al. | 285/47 |
| 3,793,411 | 2/1974 | Stonitsch et al. | 264/46.9 |
| 3,935,632 | 2/1976 | Maxson | 264/46.9 |
| 4,009,732 | 3/1977 | Martin et al. | 264/46.9 |
| 4,240,850 | 12/1980 | Arntz | 264/46.9 |
| 4,522,578 | 6/1985 | Martin, Jr. et al. | 264/46.9 |
| 4,564,487 | 1/1986 | Bennett | 264/46.9 |
| 4,956,133 | 9/1990 | Payne | 264/45.7 |

FOREIGN PATENT DOCUMENTS

| | | | |
|---|---|---|---|
| 421 269 | 4/1991 | European Pat. Off. | |
| 53-37107 | 10/1978 | Japan | 264/46.9 |
| 1 220 349 | 1/1971 | United Kingdom | 264/46.9 |

OTHER PUBLICATIONS

Plast Verarbeiter, Kontinuierlich Schaeumen, Huthig GmbH, Heidelberg (undated).

*Primary Examiner*—Allan R. Kuhns
*Attorney, Agent, or Firm*—Fernando A. Borrego

[57] ABSTRACT

A process for producing pipes insulated with foams comprises providing, between an inner carrier pipe and an outer pipe arranged parallel thereto, a holder which is provided with at least one aperture and is mounted so that it can be moved axially and positions the carrier pipe in the outer pipe and introducing into the vacant space between the two pipes, via the aperture(s) in the holder, a mixture for the preparation of foams, where during the introduction of the mixture, the holder moves in an axial direction with respect to the outer pipe and the carrier pipe, then after the mixture is charged, it is reacted to give the foam and the holder and, if desired, the outer pipe are removed.

2 Claims, 2 Drawing Sheets

PRODUCTION OF PIPES INSULATED WITH FOAMS

SUMMARY OF THE INVENTION

The invention relates to a process and apparatus for producing insulated pipes by introducing a mixture for the preparation of polyisocyanate polyaddition products between a carrier pipe and an outer pipe running parallel to the carrier pipe and reacting the mixture to give foams containing polyisocyanate polyaddition products, and to the pipes which are insulated with foams and which can be produced by this process.

The invention also relates to a double-pipe system made from an inner carrier pipe and an outer pipe arranged parallel to this, where a holder which can be moved axially is arranged between the two pipes and positions the carrier pipe in the outer pipe and is provided with at least one aperture for the introduction of mixtures for the preparation of polyisocyanate polyaddition products.

The invention also relates to a holder which is designed so that it can be displaced in an axial direction between a carrier pipe and an outer pipe running parallel to the carrier pipe and positions the carrier pipe in the outer pipe and includes at least one aperture through which mixtures for the preparation of isocyanate polyaddition products can be distributed.

The continuous and discontinuous production of insulated pipes, which are used, inter alia, in the heat-transmission industry, is well known and is described, for example, in the Huting GmbH company publication (5/96 issue, pp. 30–33, Huting GmbH, Heidelberg, Germany).

In the discontinuous processes, mixtures for the preparation of rigid polyurethane foams are usually introduced with high pressure and high delivery rate into the space which is to be filled between an inner pipe to be insulated, also called a carrier pipe below, and an outer pipe which serves to protect and to stabilize the insulated inner pipe. In these processes, a disadvantage is the exacting requirements placed on the mixtures, which must be sufficiently free-flowing.

In known continuous processes, the mixtures for the preparation of the rigid foams may be applied onto the carrier pipe, and a film, for example, is then used during the foaming process as outer pipe, also termed jacket pipe below. It is also known that the carrier pipe may be laid into mixtures for the preparation of the rigid foams, these mixtures being applied onto the film. A disadvantage in these processes is the high equipment cost, since the pipes must run through a pressure belt during the foaming process in order that the films can withstand the pressure which the foaming process creates. The processing in particular of signaling wires which run within the foam is moreover complicated.

It is an object of the present invention to develop a process for producing pipes insulated with foams which allows insulated pipes having excellent properties to be produced at low equipment cost and with low requirements on the flow properties of the mixtures.

We have found that this object is achieved by
a) providing, between an inner carrier pipe and an outer pipe arranged parallel thereto, a holder which is provided with at least one aperture and is mounted so that it can be moved axially and positions the carrier pipe in the outer pipe and
b) introducing into the vacant space between the two pipes, via the aperture(s) in the holder, a mixture for the preparation of polyisocyanate polyaddition products, where b1) during the introduction of the mixture, the holder moves in an axial direction with respect to the outer pipe and the carrier pipe, then c) after the mixture is charged, it is reacted to give the foam and d) the holder and, if desired, the outer pipe are removed.

DETAILED DESCRIPTION OF THE INVENTION

Figure 1:
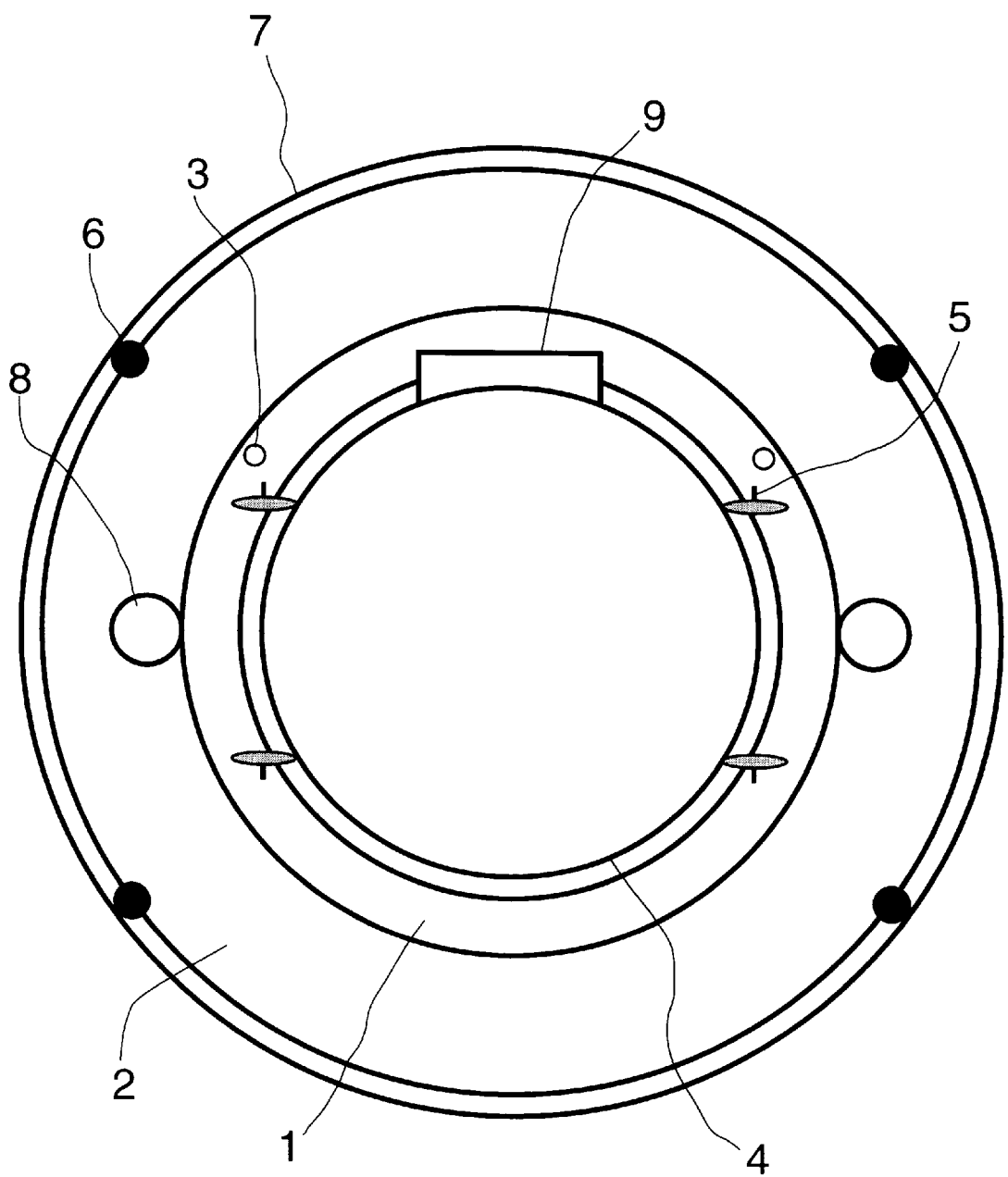
FIG. 1 shows the inner and outer rings of a holder of the invention.

The carrier pipe here is situated in the lumen of an outer pipe (jacket pipe) running parallel to it, which can serve to protect the insulated carrier pipe, the distance between the carrier pipe and the jacket pipe being preferably constant over the lengths of the pipes.

The holder which is in position while the mixtures are being passed between the carrier pipe and the jacket pipe is ring-shaped and designed so that it can be moved axially, for example using usually from 2 to 10, preferably from 3 to 6 rolling bearings, for example rollers, and/or a ball bearing on the inner edge of the holder which is in contact with the carrier pipe and usually from 2 to 10, preferably from 3 to 6 rollers and/or ball bearings on the outer edge of the holder which is in contact with the jacket pipe. The holder is preferably in contact, via ball bearings and/or rollers, both with the carrier pipe and with the outer pipe, and thus can act as a distance piece between the inner and the outer pipe to position the carrier pipe in the outer jacket pipe. It is thus possible in the novel process to dispense with the distance pieces which are necessary in known processes.

In the novel process, the mixture which can be distributed through at least one aperture, preferably from 1 to 6 apertures, in the holder, is distributed into the space which is to be filled between the inner pipe (carrier pipe) and the outer pipe (jacket pipe). The apertures may be positioned as desired in the holder, but it is preferable that the positioning does not hinder the ability of the holder to move axially and, if desired, radially between the carrier pipe and the jacket pipe. During the distribution of the mixture, it is possible both to move the holder between carrier and jacket pipe and also to move the pipes relative to the holder by conventional methods, for example using chains or hydraulically using rods or other known methods.

Before the mixture is distributed in the space between the carrier pipe and the jacket pipe, the end of the pipes at which the distribution is to begin, at least the intermediate space which is to be filled with the mixture is preferably blocked, using conventional caps or seals, so that the mixture cannot run out of the intermediate space. At the beginning of the introduction of the mixture, the holder is preferably situated near to the end of the pipes at which the intermediate space is blocked, for example using the conventional caps. During the introduction of the mixtures, the holder is preferably moved axially in the direction of the ends of the pipes at which the intermediate space is not blocked.

The holder moreover includes at least one aperture (8) to which mixing heads can, for example, be screw-fixed for distributing mixtures into the intermediate space between (4) and (7).

If the holder is of one-part construction, it is preferably movable both axially and radially between the carrier pipe and the jacket pipe. The expression capability to move axially is taken to mean the capability of the holder to move along the pipe axis, while the term capability to move radially is taken to mean that the holder is arranged so that it can be rotated around the carrier pipe.

The capability of the holder to move axially and radially between a carrier pipe and a jacket pipe may preferably be achieved by giving the holder ball bearings on the inner and outer edges. The abovementioned ball bearings here are preferably arranged at the contact points of the holder with the jacket pipe and the carrier pipe. The capability of the holder to move radially with respect to the carrier pipe or with respect to the carrier pipe and the jacket pipe has the effect that if the pipes rotate relative to the holder while the mixtures are being applied, there is no twisting of, for example, lines supplying the mixtures.

The holder particularly preferably has at least two parts and includes at least one part (1) which fits the carrier pipe or the jacket pipe and is not movable radially with respect to the pipe, and includes at least one further part (2) which fits to the respective other pipe in a manner which allows radial movement and is connected with part (1) in a manner which allows radial movement, for example by a ball bearing. This preferred construction is particularly advantageous if lines, for example signaling wires (13), are to run into the space which is to be foamed between carrier pipe and jacket pipe. These signaling wires (13) may be passed through one or more apertures (3) in part (1) while the space to be foamed is being filled. Since part (1) preferably does not have the capability to move radially with respect to the pipes (4) and (7), the position of the aperture (3) in part (1), through which the signal wires are led, does not change its angle to the carrier pipe and the jacket pipe. This also prevents twisting of the signaling wires with respect to the pipes if the pipes rotate in relation to part (2) which includes the apertures (8) through which the mixtures are distributed. The holder may preferably be ring-shaped.

A particularly advantageous design of the holder is shown in FIG. 1 by way of example and will be described in more detail below. The holder is ring-shaped, is built up from an inner ring (1) which is in contact with the carrier pipe (4) via rolling bearings (5) and has the capability to move axially, and an outer ring (2). The outer ring (2) is connected with (1) in such a way that it can be turned, ie. is capable of moving radially, and it furthermore has ball bearings (6), so that (2) is arranged between carrier pipe (4) and jacket pipe (7) with the capability to move axially and radially. The ring (2) also has the apertures (8) to which, for example, mixing heads may be fixed, for example screw-fixed, for distributing mixtures onto the carrier pipe and/or into the intermediate space between (4) and (7). The apertures may, as already described, have any position in the ring (2), but it is preferable that the positioning does not impair the capability of the holder to move axially and, if desired, radially between the carrier pipe and the jacket pipe. The ring (1) includes the aperture(s) (3), through which, for example, signaling wires are passed and can be laid in the intermediate space between (4) and (7). The ring (1) may furthermore have recesses (9) where its surface contacts (4), preferably if a cable box is arranged running axially on (4).

The carrier pipe and the jacket pipe may, for example, stand on a rotatable base, such as a turntable and, in a vertical position, be filled from above with the mixture. The carrier pipe and the outer pipe are preferably arranged vertically, the mixture being introduced from above through the holder arranged at the lower end of the pipes. The pipes may also be rotated with respect to the holder while they are horizontal, for example using rollers onto which the pipes are horizontally positioned. In this case, a holder of two-part design may preferably be used, as described at the outset, as distance piece and as holder for distributing the mixtures.

Figure 2:
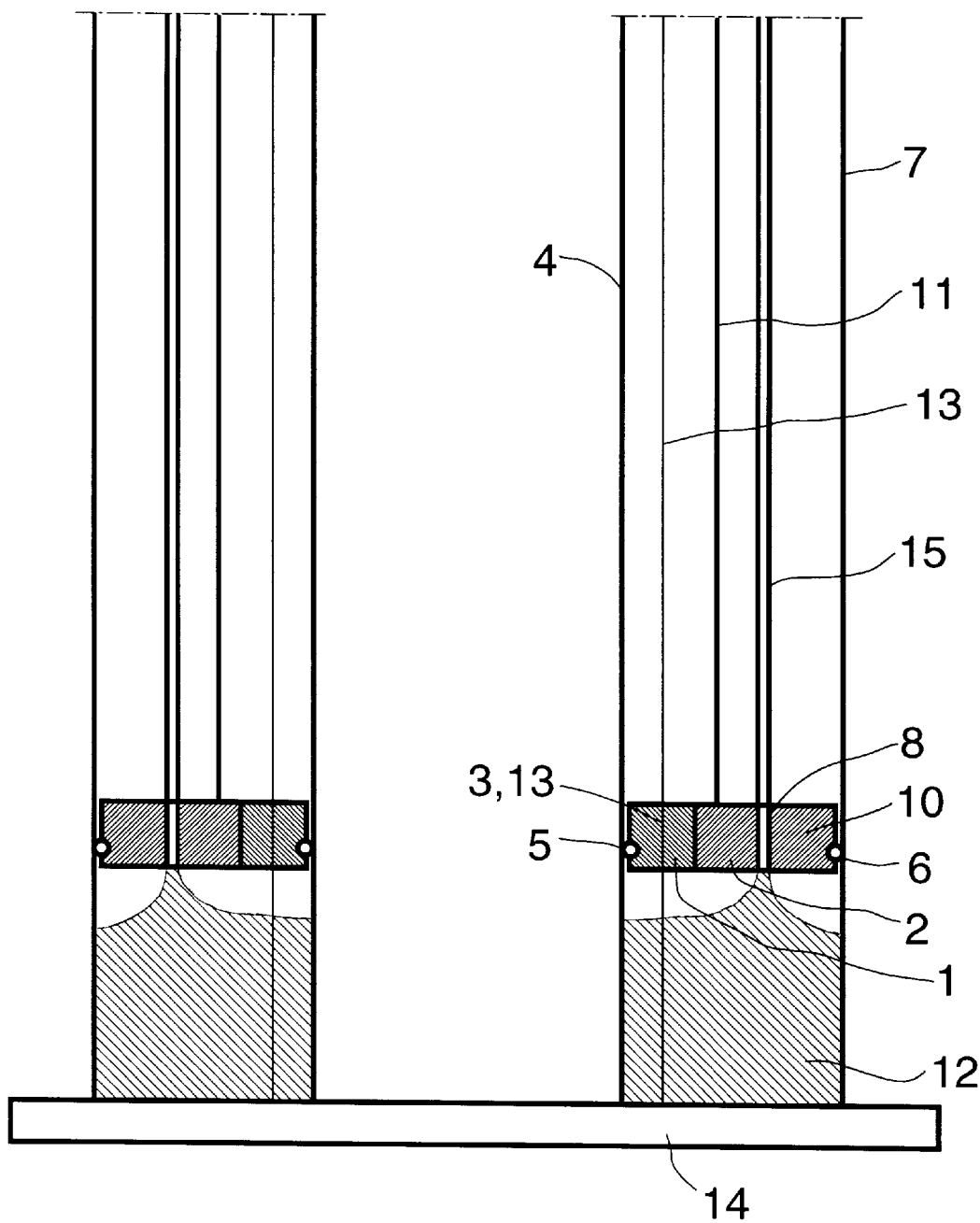
FIG. 2 shows an arrangement of the holder between a carrier pipe and a jacket pipe and application of a foamable mixture between the pipes.

FIG. 2 shows an arrangement of the holder between a vertically orientated carrier pipe and jacket pipe and the application of the mixtures, the numbering being identical in FIGS. 1 and 2. The, for example, two-part holder (10) consisting of (1) and (2), which are in contact with one another in a manner which allows rotation, for example via a ball-bearing set, is arranged between (4) and (7) with a capability to move axially given by the rollers and/or ball bearings (5) and (6). During the distribution of the mixtures (12) through the apertures (8) in the holder (10), (10) is moved upwards between (4) and (7) by means of conventional arrangements (11) for moving (10), for example by means of chains or hydraulic apparatus. Signal wires (13) may be laid into the space between (4) and (7) via the aperture(s) (3), during the distribution of the mixture. By means of rotation of the turntable (14), (4) and (7) may be rotated with respect to (2); during this, (1) moves with (4) and (7) at the same angular velocity, since (5) is in the form of rollers and not, like (6), in the form of ball bearings. (1) and (2) are connnected with one another, for example via ball bearings, in such a way that (1) and (2) can be moved axially by (11) between (4) and (7), and (1) can rotate with respect to (2), ie. can rotate with the pipes at the same velocity. The mixtures which are to be applied may be fed through, for example, tubes or pipes (15) from a conventional delivery apparatus, for example a known Puromat® from Elastogran GmbH, Lemförde, Germany.

During the application of the mixture through the holder onto the carrier pipe and/or into the intermediate space between carrier pipe and jacket pipe, the carrier pipe and the jacket pipe may preferably be rotated at the same angular velocity with respect to at least one part of the holder (2) which includes the apertures (8) for distribution of the mixtures. The rotation may be generated either by rotating the pipes or by rotating the holder by known methods.

The carrier pipe and the jacket pipe may be of curved or preferably straight design.

The carrier pipe and/or the combination of the jacket pipe and the carrier pipe oriented parallel to and within it may be in a horizontal or preferably in a vertical position when the mixtures are passed through the holder onto the carrier pipe and/or into the intermediate space between the carrier pipe and the jacket pipe. If the pipes are oriented vertically, the intermediate space is preferably filled with the mixture from above, the holder being particularly preferably moved upward along the carrier pipe during the distribution of the mixture. The velocity with which the holder moves with respect to the pipes depends on the amount of mixture which is distributed per unit of time, on the space which is to be filled with the mixture and, for example, on the reactivity of the mixture, ie. at what rate the mixture, for example, foams. If the diameter of the carrier pipe is 1000 mm, the diameter of the jacket pipe is 1200 mm, the distribution rate of the mixture is 936 g/sec with delivery, for example, by a Puromat® 80, Elastogran GmbH, Lemförde, Germany, the velocity with which the holder moves with respect to the pipes may, for example, be 5 m/min. Especially if the orientation of the pipes is horizontal, virtually any length of the pipes may be seleted, the carrier pipe preferably having a greater length than the jacket pipe. After the space between the carrier pipe and the jacket pipe has been filled with the mixture, the holder is usually removed. After the mixtures have been reacted to give foams, the pipes insulated according to the invention may be subjected to known operations and are used, for example, as pipelines for liquid or gaseous media which are to be insulated from the temperature of the surroundings, for example in the transmission of heat.

The mixtures for the preparation of polyisocyanate polyaddition products, for example of rigid polyurethane foams, may be distributed through the apertures in the holder onto the carrier pipe and/or into the intermediate space between the carrier pipe and the jacket pipe. A conventional mixing head, as generally used for distributing mixtures for the preparation of polyurethanes, may preferably be attached to the holder in such a way that the mixture can be distributed according to the invention, through the apertures in the holder. Depending on the dimensions of the pipes, one or more mixing heads may be used. Care should be taken that the individual components of the mixture are sufficiently mixed before application, the components being, for example, those which are well known from polyurethane chemistry, eg. from the preparation of rigid foams. The mixture may be delivered to the mixing heads by means of well known conventional apparatus, for example high-pressure or low-pressure metering pumps, and after application to the carrier pipe they are reacted to give polyisocyanate polyaddition products.

The holder may consist of the usual widely-used materials, for example known plastics and/or preferably metal, for example steel. In order to save material, the ring-shaped holder may have, for example, holes, recesses at the edges or the like, but these measures should preferably not impair the use of the holder according to the invention. The thickness of the holder may to a large extent be selected as desired, but sufficient strength of the holder, and preferably sufficient positioning of the carrier pipe in the jacket pipe, should preferably be achieved. The thickness of the holder is usually from 3 to 300 mm, depending on the dimensions of the carrier pipe and of the jacket pipe.

Like the holder, the carrier pipe may be constructed from, for example, conventional plastics, for example polypropylene, polyethylene, PVC, and/or from metals, for example steel. The jacket pipe is preferably produced from thermoplastically processable materials, so that heat can be used to shape and weld the jacket pipe. The jacket pipe may also, for example, consist of mineral-based materials, such as concrete, clay, glass, etc.

The carrier pipe may likewise be produced from conventional materials, for example from well known plastics, and/or from metals.

The diameter of the carrier pipe is usually from 5 to 2000 mm, preferably from 50 to 1500 mm. The jacket pipe correspondingly has a larger diameter than the carrier pipe. The diameter of the jacket pipe, which, for a given diameter of the carrier pipe, determines the width of the intermediate space between the pipes, depends on the requirements placed on the insulating foam in the intermediate space and can be adjusted accordingly. The distance between the carrier pipe and the jacket pipe, ie. the width of the intermediate layer, is usually from 25 to 1000 mm.

The mixtures which are used are generally mixtures which are suitable for the preparation of foams which can serve as insulating material. Examples of such foams are: phenolic resin foams, epoxy resin foams and melamine resin foams. Preference is given to the use of mixtures for the preparation of polyisocyanate polyaddition products, particularly preferably mixtures for the preparation of rigid foams based on polyisocyanate polyaddition products. The formulation of these mixtures for the preparation of polyisocyanate polyaddition products, for example rigid foams, is generally known and is described, for example, in EP-B 421 269. The mixtures to be used may particularly preferably be processed, ie. foamed, to give rigid foams which fulfill the requirements of the European Norm EN 253 for application in heat transmission. The mixtures may be reacted in the generally known manner to give foams containing polyisocyanate polyaddition products.

It can be advantageous to pretreat the carrier-pipe and jacket-pipe surfaces which will come into contact with the mixtures to be applied, using generally known processes, for example corona treatment, so that the mixtures retain their adhesion to the surfaces of the pipes, even, for example, after the mixtures are foamed.

It can also be advantageous to preheat the carrier pipe and/or the jacket pipe before the mixtures are charged. This may be done, for example, by inductive heating in the case of metallic pipes, or by infrared radiation or preheated air in the case of non-metallic pipes.

The novel process gives the following particular advantages there is no necessity for other distance pieces in addition to the holder, there are no high requirements for the flowability of the mixtures, ie. even mixtures of high viscosity may be processed, since it is not necessary to use a high pressure to inject the mixtures into the intermediate space between carrier and jacket pipe, no pressure belt is necessary, there are no high requirements placed on the stability of the jacket pipe, since, when the pipes are oriented vertically, the foam can rise vertically when foaming takes place in the intermediate space between the jacket and carrier pipe and it is easy to lay signal wires and cable boxes, for example those containing trace heating.

Additionally, the novel process gives very homogeneous foaming, which in known processes, in particular in discontinuous production, can be achieved only with difficulty.

I claim:

1. A process for producing pipes insulated with foams, which comprises a) providing, between an inner carrier pipe and an outer pipe arranged parallel thereto, a holder which is provided with at least one aperture and is mounted so that it can be moved axially and positions the carrier pipe in the outer pipe and b) introducing into the vacant space between the two pipes, via the aperture(s) in the holder, a mixture for the preparation of foams, where b1) during the introduction of the mixture, the holder moves in an axial direction with respect to the outer pipe and the carrier pipe, then c) after the mixture is charged, it is reacted to give the foam and d) the holder and, if desired, the outer pipe are removed, wherein the holder between the carrier pipe and the outer pipe has at least two parts and includes at least one part (1) which fits the carrier pipe or the jacket pipe and is not movable radially with respect to the pipe, and includes at least one further part (2) which fits to the respective other pipe in a manner which allows rotation and is connected with part (1) in a manner which allows rotation.

2. A process as claimed in claim 1, wherein the outer pipe and the carrier pipe are rotated with the same angular velocity with respect to the holder.

* * * * *